(12) United States Patent
Xie et al.

(10) Patent No.: US 12,309,258 B2
(45) Date of Patent: May 20, 2025

(54) ENCRYPTION IN A DISTRIBUTED STORAGE SYSTEM UTILIZING CLUSTER-WIDE ENCRYPTION KEYS

(71) Applicant: VMware, Inc., Palo Alto, CA (US)

(72) Inventors: Tao Xie, Shanghai (CN); Wenguang Wang, Santa Clara, CA (US); Ruiling Dou, Shanghai (CN); Zhao Jin, Shanghai (CN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/402,293

(22) Filed: Aug. 13, 2021

(65) Prior Publication Data
US 2022/0407685 A1 Dec. 22, 2022

(30) Foreign Application Priority Data
Jun. 21, 2021 (WO) ................. PCT/CN2021/101199

(51) Int. Cl.
*H04L 9/08* (2006.01)
*H04L 67/1097* (2022.01)

(52) U.S. Cl.
CPC .......... *H04L 9/0822* (2013.01); *H04L 9/0825* (2013.01); *H04L 9/085* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 8,498,417 B1 * | 7/2013 | Harwood | H04L 67/1097 713/193 |
| 9,274,978 B2 * | 3/2016 | DeForest | G06F 12/0246 |
| 9,953,168 B1 | 4/2018 | Lango et al. | |
| 10,284,534 B1 * | 5/2019 | Perlman | H04L 63/061 |
| 10,896,257 B2 | 1/2021 | Lango et al. | |
| 11,057,359 B2 * | 7/2021 | Wisniewski | H04L 9/0891 |
| 11,113,408 B2 * | 9/2021 | Richards | G06F 21/62 |
| 11,675,739 B1 * | 6/2023 | Schenk | G06F 16/148 707/741 |
| 2014/0079221 A1 * | 3/2014 | McCallum | H04L 9/0822 380/277 |
| 2018/0270060 A1 * | 9/2018 | Gray | H04L 63/06 |
| 2018/0373879 A1 * | 12/2018 | Lango | H04L 63/0428 |
| 2019/0068370 A1 * | 2/2019 | Neerumalla | H04L 9/3226 |

(Continued)

FOREIGN PATENT DOCUMENTS

WO WO-2022125943 A1 * 6/2022

*Primary Examiner* — Saleh Najjar
*Assistant Examiner* — Shadi H Kobrosli
(74) *Attorney, Agent, or Firm* — King Intellectual Asset Management

(57) ABSTRACT

A method for encryption in a distributed datastore is provided. The method generally includes receiving random data from a virtualization management platform as a wrapped data encryption key (DEK), retrieving a key encryption key (KEK) from a key management server (KMS), decrypting the wrapped DEK using the KEK to determine a blank DEK, where the blank DEK is common to a plurality of hosts of a host cluster accessing a distributed datastore; encrypting first data using the blank DEK, and storing the encrypted first data in one or more disks of the distributed datastore, the one or more disks belonging to the plurality of hosts.

20 Claims, 8 Drawing Sheets

(56) References Cited

U.S. PATENT DOCUMENTS

| | | | |
|---|---|---|---|
| 2019/0173674 A1* | 6/2019 | Agarwal | H04L 9/0891 |
| 2020/0259637 A1* | 8/2020 | Spohn | H04L 9/0643 |
| 2021/0111875 A1* | 4/2021 | Le Saint | H04L 9/0861 |
| 2022/0021524 A1* | 1/2022 | Peddada | H04L 9/3066 |
| 2022/0179674 A1* | 6/2022 | Goel | G06F 9/45558 |
| 2022/0253389 A1* | 8/2022 | Fay | H04L 9/50 |
| 2022/0329413 A1* | 10/2022 | Schindewolf | G06F 21/6218 |
| 2022/0374885 A1* | 11/2022 | Clark | G06F 21/602 |
| 2023/0144072 A1* | 5/2023 | Shemer | H04L 9/0822 |
| | | | 713/193 |

* cited by examiner

ENCRYPTION IN A DISTRIBUTED STORAGE SYSTEM UTILIZING CLUSTER-WIDE ENCRYPTION KEYS

CROSS-REFERENCE TO RELATED APPLICATIONS

This application claims priority to International Application No. PCT/CN2021/101199, filed Jun. 21, 2021. The entire contents of this application are hereby incorporated by reference in their entirety.

BACKGROUND

Distributed storage systems allow multiple clients in a network to access a pool of shared resources. For example, a distributed storage system allows a cluster of host computers to aggregate local disks (e.g., solid state drive (SSD), peripheral component interconnect (PCI)-based flash storage, etc.) located in, or attached to, each host computer to create a single and shared pool of storage. This pool of storage (sometimes referred to herein as a "datastore" or "data storage") is accessible by all host computers in the host cluster and may be presented as a single namespace of storage entities, such as a hierarchical file system namespace in the case of files, a flat namespace of unique identifiers in the case of objects, etc. Data storage clients in turn, such as virtual machines (VMs) spawned on the host computers, may use the datastore, for example, to store virtual disks that are accessed by the VMs during their operations. For example, a distributed object-based datastore, such as a virtual storage area network (VSAN) datastore, may store data received from multiple users (e.g., VMs of clients) as data blocks in physical data blocks (also referred to physical blocks) at different times.

Modern distributed datastores, including VSAN, offer many advantages, such as superior performance, incremental scalability, and high availability; however, ensuring the confidentiality of sensitive data remains a concern given the data is stored in a pool of resources physically owned by various entities. Accordingly, robust security solutions, including encryption capabilities, have been deployed in distributed datastores to help protect sensitive data-at-rest and meet compliance regulations.

An important line of defense in cybersecurity, data encryption is a security method where information is encoded and can only be accessed or decrypted by a user with the correct decryption key. In some cases, a decryption key may be the same as the encryption key used to encrypt the data, such as in the case of symmetric keys. In some cases, a decryption key may be a different key than used to encrypt the data, such as in the case of asymmetric keys. Certain aspects discussed herein are with respect to symmetric keys where the encryption key is also used for decryption. Encrypted data, also known as cipher text, appears scrambled or unreadable to a person or entity accessing without permission. Data encryption is used to deter malicious or negligent parties from accessing sensitive data.

When encryption is enabled in a datastore, one or more encryption keys are generated and used for encoding/decoding data. In cryptography, a "key" is a piece of information used in combination with an algorithm (a 'cipher') to transform plain text into cipher text (e.g., encryption) and vice versa (e.g., decryption). Encryption keys are designed with algorithms intended to ensure that every key is unpredictable and unique. However, strength of the encryption is not defined by strength of the algorithm, but by management of the encryption keys. The secrecy and security of encryption keys are the foundation of effective encryption. Encryption key management maintains secrecy and security by administering policies and procedures for generating, protecting, storing, organizing, distributing, and destroying encryption keys. A lost or stolen key in the possession of an unauthorized user has the potential to compromise the security of the entire datastore.

To encrypt data in a distributed object storage, such as VSAN, two levels of keys, a first level Key Encryption Key (KEK) and a second level Data Encryption Key (DEK), are generated. The KEK is typically generated from an external (e.g., external to a data center) key management server (KMS) and is used to encrypt the DEK. The DEK is used to encrypt data prior to storage in the VSAN and is randomly generated for each disk of a host in a host cluster sharing the datastore. Two levels of keying are used in VSAN to efficiently rotate encryption keys on a periodic basis (e.g., rekey) to meet compliance requirements for security.

Accordingly, data stored in a first physical block of a disk of a host computer may be encrypted with a DEK corresponding to that disk (e.g., corresponding to that host computer). However, given the distributed nature of the datastore, at a subsequent time the data originally stored in the first physical block may be moved to a new physical block, and in some cases, to a physical block of a disk having a different DEK (e.g., in some cases, a disk of a different host). Such migration may have adverse impacts on latency and available resources within the distributed datastore. Accordingly, techniques are needed for encryption (and decryption), and more specifically key generation to enable encryption (and decryption), in a distributed datastore.

It should be noted that the information included in the Background section herein is simply meant to provide a reference for the discussion of certain embodiments in the Detailed Description. None of the information included in this Background should be considered as an admission of prior art.

DETAILED DESCRIPTION

Aspects of the present disclosure introduce methods for secure key generation to enable encryption in a distributed datastore. Encryption data keys may be generated for a cluster of host computers accessing the distributed datastore such that all hosts encrypting data within the datastore are encrypting the data with common encryption keys. In certain embodiments, a cluster-wide Key Encryption Key (KEK) and Data Encryption Key (DEK) are generated and used by all hosts in the cluster for data encryption and decryption. Further, encryption key management procedures for generating, protecting, storing, organizing, distributing, and destroying encryption keys are provided for maintaining integrity of the distributed datastore. Certain aspects discussed herein are with respect to symmetric keys where the encryption key is also used for decryption. However, the techniques may be similarly applicable to asymmetric keys.

Figure 1:
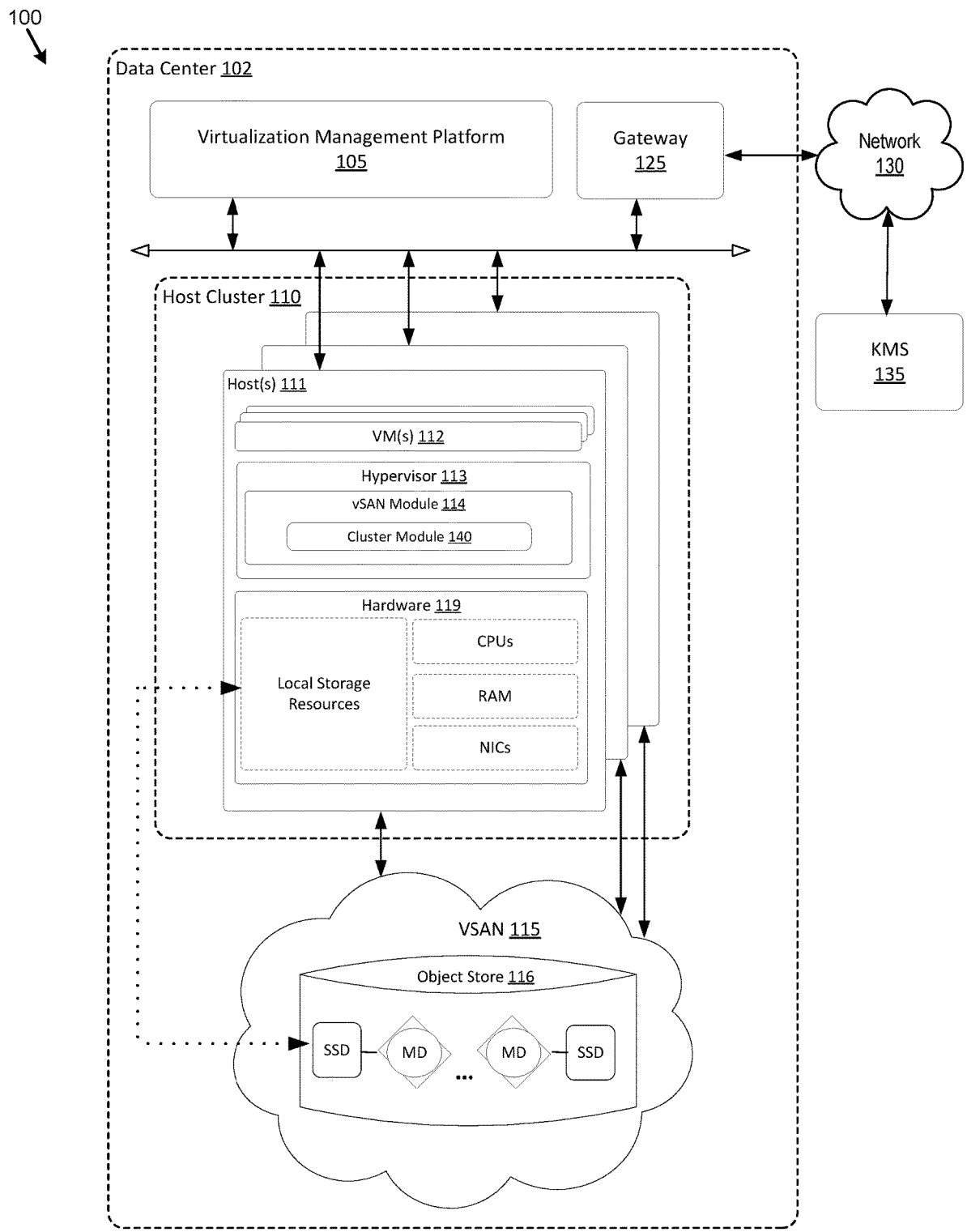
FIG. 1 depicts example physical and virtual network components with which embodiments of the present disclosure may be implemented.

FIG. 1 depicts example physical and virtual network components in a network environment 100 in which embodiments of the present disclosure may be implemented. As shown, networking environment 100 includes a set of networked computing entities, and may comprise a logical overlay network. Networking environment 100 includes a data center 102 and network 130. Network 130 may be a layer 3 (L3) physical network.

Data center 102 may be a software defined datacenter (SDDC). Data center 102 includes gateway 150 which provides components in data center 102 with connectivity to network 130 and is used to communicate with destinations external to data center 102, such as a key management server (KMS) 135. Gateway 150 may be a virtual computing instance, a physical device, or a software module running within each of hosts 111.

KMS 135, described in more detail below, delivers encryption key management functionality for the generation and distribution of encryption keys. KMS 135 ultimately controls the generation, usage, storage, archival, and deletion of KEK(s). KMS 135 ensures that the right encryption keys are in the right place at the right time without impacting network or application performance.

As shown, data center 102 may include a distributed object-based datastore, such as a software-based "virtual storage area network" (VSAN) 115 environment that leverages the commodity local storage housed in or directly attached (hereinafter, use of the term "housed" or "housed in" may be used to encompass both housed in, or otherwise directly attached) to hosts (or nodes) 111 of a host cluster 110 to provide an aggregate object store 116 to virtual machines (VMs) 112 running on hosts 111. The local commodity storage housed in hosts 111 may include combinations of solid state drives (SSDs) or non-volatile memory express (NVMe) drives, magnetic disks (MDs) or spinning disks or slower/cheaper SSDs, or other types of storages.

Additional details of VSAN are described in U.S. Pat. No. 10,509,708, the entire contents of which are incorporated by reference herein for all purposes, and U.S. patent application Ser. No. 17/181,476, the entire contents of which are incorporated by reference herein for all purposes.

VSAN 115 may be a two-tier datastore, thereby storing data blocks in both a smaller, but faster, performance tier and a larger, but slower, capacity tier. The data in the performance tier may be stored in a first object and when the size of data reaches a threshold, the data may be written to the capacity tier (e.g., in full stripes, wherein a full stripe write refers to a write of data blocks that fill a whole stripe) in a second object in the capacity tier. Accordingly, SSDs may serve as a read cache and/or write buffer (e.g., in the performance tier) in front of MDs or slower/cheaper SSDs (e.g., in a capacity tier of VSAN 115) to enhance input/output (I/O) performance. In certain other embodiments, both performance and capacity tiers may leverage the same type of storage (e.g., SSDs) for storing the data and performing the read/write operations. Additionally, it should be noted that SSDs may include different types of SSDs that may be used in different layers (tiers) in some embodiments.

As further discussed below, each host 111 may include a storage management module (referred to herein as a "VSAN module 114") in order to automate storage management workflows (e.g., create objects in object store 116, etc.) and provide access to objects in object store 116 (e.g., handle I/O operations on objects in object store 116, etc.) based on predefined storage policies specified for objects in object store 116. For example, because a VM 112 may be initially configured by an administrator to have specific storage requirements for its "virtual disk" depending on its intended use (e.g., capacity, availability, input/output operations per second (IOPS), etc.), the administrator may define a storage profile or policy for each VM 112 specifying such availability, capacity, IOPS and the like. VSAN module 114 may then create an "object" for the specified virtual disk by backing it with physical storage resources of the object store based on the defined policy.

A virtualization management platform 105 is associated with host cluster 110 of hosts 111. Virtualization management platform 105 enables an administrator to manage the configuration and spawning of VMs 112 on hosts 111. As depicted in the embodiment of FIG. 1, each host 111 includes a virtualization layer or hypervisor 113, a VSAN module 114, and hardware 119 (which includes the SSDs and MDs of a host 111). Through hypervisor 113, a host 111 is able to launch and run multiple VMs 112. Hypervisor 113, in part, manages hardware 119 to properly allocate computing resources (e.g., processing power, random access memory (RAM), etc.) for each VM 112. Furthermore, as described below, each hypervisor 113, through its corresponding VSAN module 114, may provide access to storage resources located in hardware 119 (e.g., SSDs and magnetic disks) for use as storage for storage objects, such as virtual disks (or portions thereof) and other related files that may be accessed by any VM 112 residing in any of hosts 111 in host cluster 110.

In one embodiment, VSAN module 114 may be implemented as a "VSAN" device driver within hypervisor 113. In such an embodiment, VSAN module 114 may provide access to a conceptual "VSAN" 115 through which an administrator can create a number of top-level "device" or namespace objects that are backed by object store 116. Because VSAN 115 supports multiple file system objects, it is able to provide storage resources through object store 116 without being confined by limitations of any particular clustered file system. For example, many clustered file systems may only scale to support a certain amount of hosts 111. By providing multiple top-level file system object support, VSAN 115 may overcome the scalability limitations of such clustered file systems.

A file system object may, itself, provide access to a number of virtual disk descriptor files accessible by VMs 112 running in host cluster 110. These virtual disk descriptor files may contain references to virtual disk "objects" that contain the actual data for the virtual disk and are separately backed by object store 116. A virtual disk object may itself be a hierarchical, "composite" object that is further composed of "component" objects (again separately backed by object store 116) that reflect the storage requirements (e.g., capacity, availability, IOPs, etc.) of a corresponding storage profile or policy generated by the administrator when initially creating the virtual disk. Each VSAN module 114 may communicate with other VSAN modules 114 of other hosts 111 to create and maintain an in-memory metadata database (e.g., maintained separately but in synchronized fashion in the memory of each host 111) that may contain metadata describing the locations, configurations, policies and relationships among the various objects stored in object store 116. This in-memory metadata database is utilized by a VSAN module 114 on a host 111, for example, when a user (e.g., an administrator) first creates a virtual disk for a VM 112 as well as when the VM 112 is running and performing I/O operations (e.g., read or write operations) on the virtual disk.

In some embodiments, VSAN module 114 may also include a cluster module 140, such as a cluster monitoring, membership, and directory services (CMMDS) module, that maintains the previously discussed in-memory metadata database to provide information on the state of host cluster 110 to other modules of VSAN module 114 and also tracks the general "health" of cluster host 110 by monitoring the status, accessibility, and visibility of each host 111 in host cluster 110. The in-memory metadata database may serve as a directory service that maintains a physical inventory of a VSAN 115 environment, such as hosts 111, the storage resources in hosts 111 (SSD, NVMe drives, MDs, etc.) housed therein and the characteristics/capabilities thereof, the current state of the hosts 111 and their corresponding storage resources, network paths among hosts 111, and the like.

Within host cluster 110, a host 111 may be designated as a master host 111 that is elected by all hosts 111 within host cluster 110. The role of master host 111 is to extract cluster module 140 updates from all hosts 111 and, in some cases, distribute the updates to other hosts 111.

As previously discussed above, a VM 112 running on one of hosts 111 may perform I/O operations on a virtual disk that is stored as a hierarchical composite object in object store 116. Hypervisor 113 may provide VM 112 access to the virtual disk by interfacing with the abstraction of VSAN 115 through VSAN module 114. For example, VSAN module 114, by querying its local copy of the in-memory metadata database, may be able to identify a particular file system object stored in VSAN 115 that may store a descriptor file for the virtual disk. A descriptor file may include a reference to composite object that is separately stored in object store 116 and conceptually represents the virtual disk (and thus may also be sometimes referenced herein as a virtual disk object). A composite object may store metadata describing a storage organization or configuration for the virtual disk (sometimes referred to herein as a virtual disk "blueprint").

In object store 116 of VSAN 115, data striping may be implemented, wherein data striping refers to segmenting logically sequential data, such as a virtual disk. Each stripe may contain a plurality of data blocks, and in some cases, each stripe may also include one or more code blocks (e.g., redundant array of inexpensive disks (RAID) 5 or RAID 6).

The stripes are split vertically into different groups of blocks, referred to as chunks, where each chunk is logically represented as a "leaf" or "component" object to which composite object contains a reference. Several data and code blocks may be situated on different rows (referred to herein as stripes) and columns (referred to herein as chunks), where each column is associated with a physical disk of a host machine 111.

The metadata accessible by VSAN module 114 in the in-memory metadata database for each component object provides a mapping to or otherwise identifies a particular host 111 in host cluster 110 that houses the physical storage resources (e.g., MDs or slower/cheaper SSDs, etc.) that actually store the chunk (as well as the location of the chunk within such physical resource).

In some embodiments, encryption is enabled in VSAN 115 thereby providing native hyper-converged infrastructure encryption. More specifically, encryption capability may be built into hypervisors 113 and enabled at the host cluster level such that all objects residing in object store 116 of VSAN 115 are encrypted. In some embodiments, VSAN encryption performs encryption anywhere data is at rest, e.g., at both the performance and capacity tiers of VSAN 115. In some cases, data is encrypted as it enters the performance tier and, as it destages (e.g., a write from the cache to the capacity tier), is decrypted. Finally, the data enters the capacity tier, where it may be encrypted again.

For VSAN encryption, virtualization management platform 105 requests KMS 135 to generate a KEK. KMS 135 may be compliant with widely accepted key management interoperability protocol (KMIP) 1.1 in order to associate KMS 135 with virtualization management platform 105. As described herein, KMS 135 generates KEK(s) (and their corresponding KEK identifier(s)) that may be used by hosts 111 in host cluster 110 for encryption.

The VSAN encryption is a two-level encryption using the KEK generated by KMS 135 to encrypt a DEK. The DEK is a randomly generated key used to encrypt data on each disk. The KEK can be used to encrypt the DEK to create encrypted DEKs (also referred to herein as wrapped DEKs). Each host 111 accessing VSAN 115 stores the encrypted DEKs, but does not store the KEK, on the disk. For encryption of a DEK or decryption of a wrapped DEK, host 111 requests the KEK from KMS 135. A host 111 may establish a connection with KMS 135 using KMS information received from virtualization management platform 105 so that a KEK may be retrieved from KMS 135 (e.g., using its corresponding KEK identifier).

In conventional implementations, because a unique DEK is generated for each disk and multiple disks are used to store data in VSAN 115, data contained within VSAN 115 may be encrypted with different DEKs. As an illustrative example, a stripe containing three data blocks (e.g., DB1, DB2, and DB3) in the performance tier of VSAN 115 may be situated in a single row having multiple columns, wherein each column is associated with a physical disk of a different host 111 of host cluster 110. Therefore, DB1, DB2, and DB3 may be encrypted using different DEKs. Assuming DB1 is situated in a column associated with a first physical disk having a first DEK (e.g., DEK1), DB1 may be encrypted with DEK1 prior to storage. Similarly, assuming DB2 is situated in a column associated with a second physical disk having a second DEK (e.g., DEK2) and DB3 is situated in a column associated with a third physical disk having a third DEK (e.g., DEK3), DB2 may be encrypted with DEK2 and DB3 may be encrypted with DEK3 prior to storage.

Although encrypting different blocks of data with different DEKs increases security and reduces a likelihood of the integrity of the datastore becoming compromised, disk-specific DEKs may not be an ideal solution for security of the distributed datastore. Specifically, given the distributed nature of datastores, such as VSAN, data originally stored in a first physical block may be moved to a new physical block, and in some cases, to a physical block of a disk having a different DEK (e.g., in some cases, a disk of a different host). For example, data stored in a first physical block on a first disk of a first host may be originally encrypted with a DEK associated with the first host (e.g., DEK1). If the data stored in the first physical block is to be moved to a second physical block on a second disk of a second host, the first host may first decrypt the originally encrypted data using DEK1 before the data is transferred to the second host, where the second host re-encrypts the data with a DEK associated with the second host (e.g., DEK2). Such migration may adversely impact performance of the datastore by using additional resources for decryption (e.g., with a DEK of the original disk) and encryption (e.g., with a DEK of the new disk) each time data is relocated to a physical block of a different physical disk as well as increasing latency thereby creating lag within the system.

Aspects of the present disclosure introduce methods for secure key generation to enable encryption in a distributed datastore using cluster wide encryption keys to reduce overhead. In particular, encryption data keys may be generated for a cluster of host computers accessing the distributed datastore such that all hosts encrypting data within the datastore are encrypting the data with common encryption keys. Various solutions are presented herein for secure key generation and distribution to enable encryption in a distributed datastore. Each solution may involve the use of a cluster wide KEK and DEK generated by and/or distributed to one or more hosts 111 in host cluster 110 and associated with VSAN 115. Having a cluster-wide DEK may eliminate additional decryption and encryption when data is moved from a disk of one host to a disk of another host while stored in VSAN 115 (e.g., due to data flushing, segment cleaning, etc.).

Figure 2:
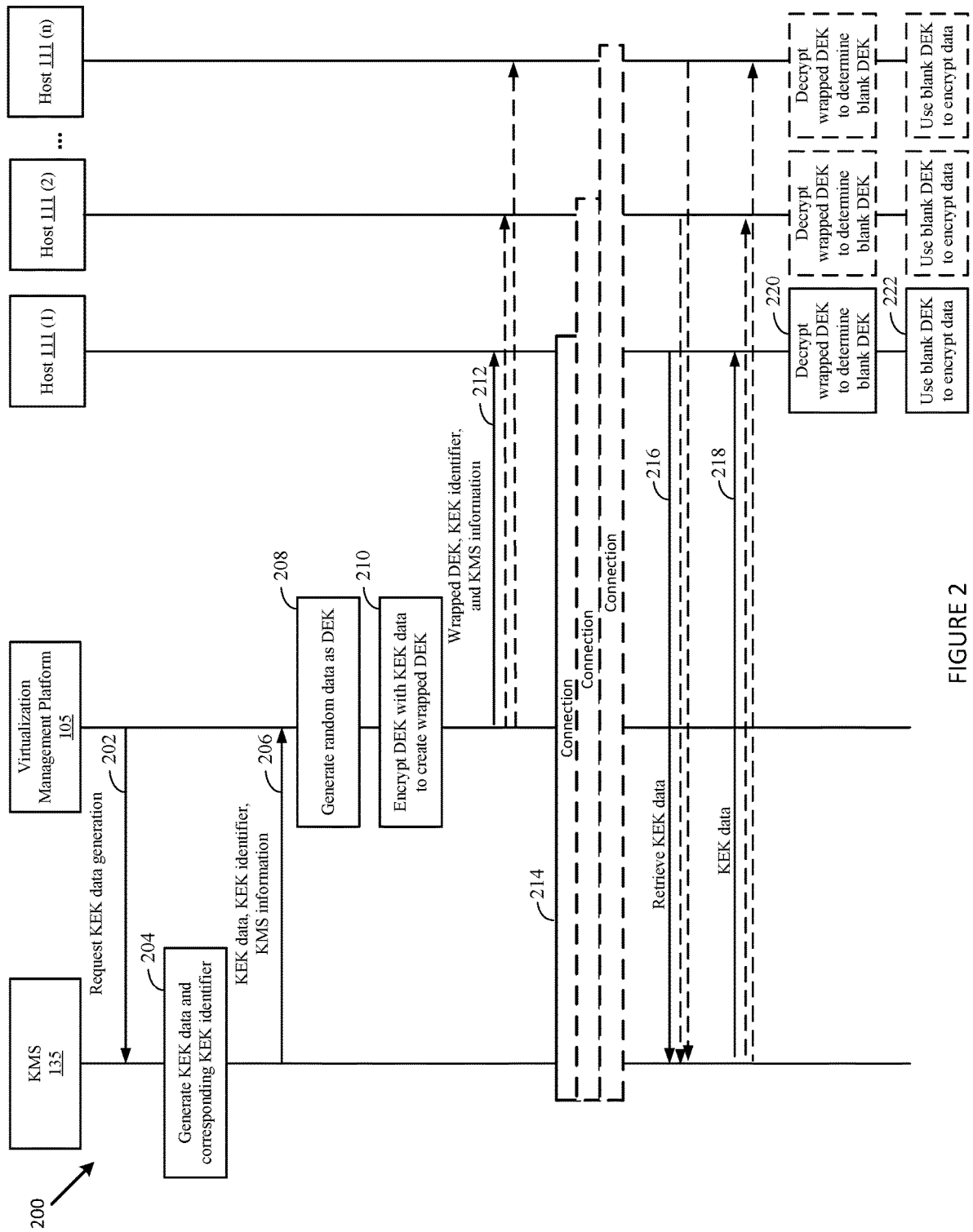
FIG. 2 is a call flow diagram illustrating example key generation to enable encryption in a distributed datastore, according to an example embodiment of the present application.

FIG. 2 is a call flow diagram 200 illustrating example key generation to enable encryption in a distributed datastore, according to an example embodiment of the present application. The solution described with respect to FIG. 2 involves the administration (e.g., retrieval, generation, and distribution) of both the KEK and DEK by a virtualization management platform, such as virtualization management platform 105 described with respect to FIG. 1. As shown in FIG. 2, at 202, virtualization management platform 105 may request generation of a KEK (also referred to herein as KEK data) by a KMS, such as KMS 135 described with respect to FIG. 1, via an application programming interface (API) request. In response to the request, at 204, KMS 135 may generate KEK data, as well as a corresponding KEK identifier associated with the generated KEK data. At 206, KMS 135 may provide virtualization management platform 105 the generated KEK data, the KEK identifier, and KMS information. KMS information may include addressing information for establishing a connection with KMS 135. For example, KMS information may be used by a host 111 to establish a connection with KMS 135 for retrieval of one or more keys (as discussed in more detail below at operation 214).

At 208, virtualization management platform 105 may generate random data as a DEK, and further, at 210, use the received KEK data to encrypt the DEK (also referred to herein as wrapping the DEK). Encrypting DEK with KEK data may produce a wrapped DEK for distribution to one or more hosts. Accordingly, at 212, virtualization management platform 105 may provide the wrapped DEK, the KEK identifier, and KMS information to one or more hosts, such as hosts 111 described with respect to FIG. 1. In some embodiments, virtualization management platform 105 provides the wrapped DEK, the KEK identifier, and the KMS information to all hosts 111 in host cluster 110.

A variable number, n, of hosts 111 (e.g., Host 111 (1), Host 111 (2), . . . Host 111 (n)) may receive the wrapped DEK, KEK identifier, and KMS information, where n is an integer greater than or equal to 1. At 214, each of hosts 111 may use the received KMS information to establish a connection with KMS 135 and then, at 216, use the received KEK identifier to retrieve the corresponding KEK data from KMS 135. At 218, each host 111 may receive the KEK data from KMS 135.

At 220, each host 111 may use the retrieved KEK data to decrypt the wrapped DEK received at 212. A blank DEK (also referred to herein as an unwrapped DEK or DEK) may result from decrypting the wrapped DEK with the KEK data. A blank DEK may be an unwrapped (e.g., decrypted) DEK such that contents of the DEK may be accessed. A blank DEK does not mean that the DEK contains no values. Thus, using the same wrapped DEK and the KEK data, each of hosts 111 may generate the same DEK. At 222, each host 111 may use the blank DEK to encrypt (and also decrypt) data stored in VSAN 115.

While FIG. 2 illustrates hosts 111 (1)-(n) performing steps 212-222 concurrently, steps 212-222 of a first host 111 (e.g., Host 111 (1)) may be performed at a time different than steps 212-222 performed at another host 111 (e.g., Hosts 111 (2)-(n)). Each host 111 may independently perform steps 212-222, e.g., when data is presented for encryption and/or decryption (e.g., read or write requests) by each host 111.

To protect against possible exposure of the initial encryption key (e.g., generated DEK), rekeying processes may be implemented. Rekeying is known as the process of modifying an encryption key, to reduce the amount of data encoded with similar keys. Rekeying is a protective mechanism to keep an attacker from accessing sensitive data encrypted with the same key. The rekeying process may occur after a predetermined amount of data has been encrypted or a particular period of time has elapsed.

Two types of rekey procedures may include shallow rekeying and deep rekeying. A shallow rekey is quick and simple, only changing the KEK which is used to wrap the DEK. On the other hand, deep rekeying is a slow process which changes both the KEK and DEK, where all data may be decrypted and re-encrypted again with the changed DEK. Every deep rekey operation, by default, forces a shallow rekey. Although deep rekeying is a slower process compared to shallow rekeying, deep rekeying may achieve additional security. Both rekey operations may be performed without performing a shutdown of a host cluster or VMs running on one or more hosts. Shallow rekey may be scheduled more regularly than deep rekey; however, in some cases, deep rekey may be required, for example, when the DEK is leaked.

For the solution presented in FIG. 2, a shallow rekey procedure may begin by virtualization management platform 105 decrypting a previously wrapped DEK (e.g., wrapped DEK created at 210 in FIG. 2) with the original KEK data (e.g., KEK data received from KMS 135 at 206 in FIG. 2). The unwrapped DEK may be a blank DEK.

Virtualization management platform 105 may then retrieve new KEK data from KMS 135 and re-encrypt the blank DEK with the new KEK data. The newly wrapped DEK, new KEK identifier, and KMS information may be transmitted to a variable number, n, of hosts 111 (e.g., Host 111 (1), Host 111 (2), . . . Host 111 (*n*)), and each of hosts 111 may retrieve KEK data from KMS 135 using the new KEK identifier and KMS information. The newly wrapped DEK may be decrypted using the retrieved KEK to determine a blank DEK to use for encryption and/or decryption. Essentially, the shallow rekey procedure involves retrieving a new KEK and then repetition of steps 212 through 222 by hosts 111. As described, only the KEK data may change while the DEK data remains the same but is encrypted with the new KEK data.

Alternatively, for the solution presented in FIG. 2, a deep rekey procedure essentially requires repetition of all steps 202 through 222 to generate both new DEK and KEK data. For example, virtualization management platform 105 may request new KEK data and generate new random data as the new DEK. Hosts 111 may determine the new DEK in a similar manner as presented in steps 212 through 222 of FIG. 2; however, the new KEK data may be used to decrypt the wrapped DEK, as opposed to original (or prior) KEK data.

The solution presented in FIG. 2 ensures all hosts 111 within a host cluster 110 end up with a common DEK for encryption of data, thereby eliminating the need for additional decryption and encryption when data is moved from a disk of one host to a disk of another host while stored in VSAN 115 (e.g., due to data flushing, segment cleaning, etc.). However, for this solution, because virtualization management platform 105 retrieves KEK data from KMS 135 for the encryption of DEK prior to transmitting the encrypted DEK to hosts 111, there may be some drawbacks with respect to security. For example, after retrieving KEK data and generating random data as DEK (e.g., after 208), the KEK and DEK may be stored in memory. Thus, in a situation where the virtualization management platform 105 crashes, a core dump may be created by the system. A core dump (e.g., a memory dump) may include the recorded state of the working memory of a computer program at a specific time; thus, the core dump may include the KEK and DEK stored in memory. Because a core dump does not include encrypted data, there is a greater likelihood that encryption keys may be leaked, and in some cases, compromised by a hacker. Additionally, because the solution presented in FIG. 2 requires both virtualization management platform 105 and hosts 111 to retrieve KEK data from KMS 135, multiple copies of the KMS management code and cryptograph library are maintained for each of virtualization management platform 105 and hosts 111. The redundancy of such information may undermine the security of the system and increase the vulnerability of sensitive data stored within VSAN 115.

Figure 3A:
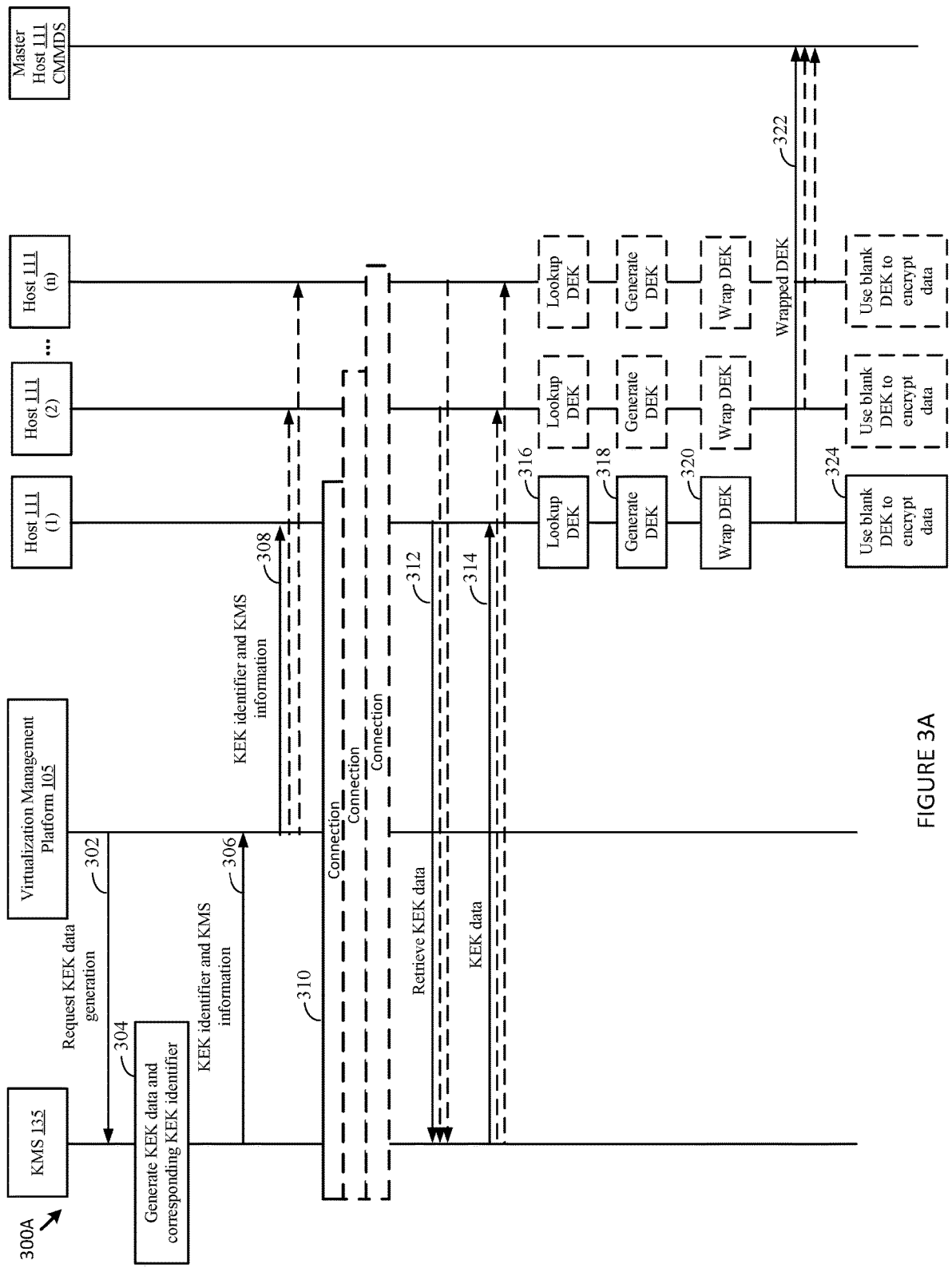
FIG. 3A is a call flow diagram illustrating example key generation utilizing an inventory manager for a cluster of host computers to enable encryption in a distributed datastore, according to an example embodiment of the present application.
Figure 3B:
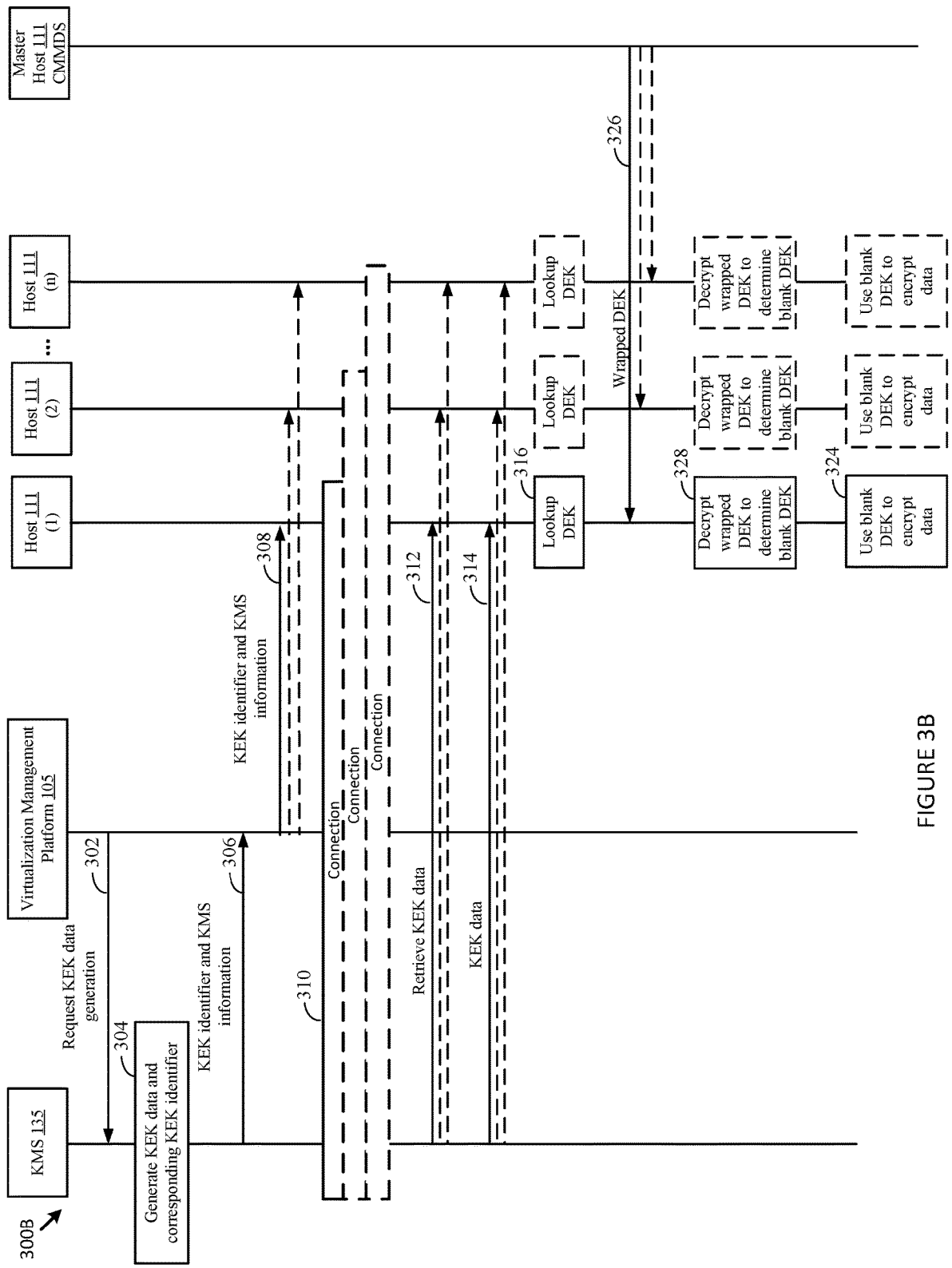
FIG. 3B is a call flow diagram illustrating another example key generation utilizing an inventory manager for a cluster of host computers to enable encryption in a distributed datastore, according to an example embodiment of the present application.

FIGS. 3A and 3B are call flow diagrams, 300A and 300B, illustrating example key generation operations utilizing an inventory manager for a cluster of host computers to enable encryption in a distributed datastore, according to an example embodiment of the present application. The solution described with respect to FIGS. 3A and 3B involves the administration (e.g., retrieval and distribution) of both the KEK and DEK by one or more hosts 111 accessing VSAN 115, as opposed to virtualization management platform 105 in the solution presented with respect to FIG. 2.

As shown in FIGS. 3A and 3B, and similar to FIG. 2, at 302, virtualization management platform 105 may request generation of KEK data by KMS 135 via an API request. In response to the request, at 304, KMS 135 may generate KEK data, as well as a corresponding KEK identifier associated with the generated KEK data. However, unlike FIG. 2, at 306, KMS 135 may transmit to virtualization management platform 105 only the KEK identifier and KMS information, and not the KEK data itself. Accordingly, the potential for compromised KEK in a core dump at virtualization management platform 105 may be avoided in this solution.

At 308, the KEK identifier and KMS information may be further transmitted by virtualization management platform 105 to one or more hosts, such as hosts 111 described with respect to FIG. 1. A variable number, n, of hosts 111 (e.g., Host 111 (1), Host 111 (2), . . . Host 111 (*n*)) may receive the KEK identifier and KMS information. At 310, each of hosts 111 may use the received KMS information to establish a connection with KMS 135 and, at 312, use the received KEK identifier to retrieve the corresponding KEK data from KMS 135. At 314, each host 111 may receive the KEK data from KMS 135.

At 316, each host 111 may lookup a DEK entry in a cluster module 140, such as a CMMDS module, to locate a wrapped DEK. As described herein, cluster module 140 may serve as a directory service that maintains a physical inventory of VSAN environment 115. Cluster module 140 may also maintain one or more wrapped DEKS, published by each of hosts 111. For example, in some cases, a master host 111 may receive encrypted (e.g., wrapped) DEKs published from hosts 111 within host cluster 110 thereby maintaining an inventory of wrapped DEKs for host cluster 110. Thus, at 316, if a DEK entry is found within the directory by cluster module 140, this indicates one or more hosts 111 previously published a wrapped DEK to cluster module 140.

As shown in FIG. 3A, if a DEK entry is not found within the directory by cluster module 140 of a given host 111 at 316, then at 318, such a host 111 may generate a DEK (e.g., a blank DEK). A given host 111 may fail to locate a DEK entry and generate a DEK at a same time or different time than another host 111 also failing to locate a DEK entry and generating a DEK. The host 111 encrypts the generated DEK with the received KEK data, at 320, to create a wrapped DEK. At 322, the host 111 that has produced a wrapped DEK may publish the wrapped DEK to cluster module 140 of master host 111. As described in more detail below, two or more hosts 111 capable of publishing wrapped DEKs may lead to collisions when more than one host 111 is publishing at a same time. Additionally, at 324, the host 111 may use the blank DEK to encrypt (and also decrypt) data stored in VSAN 115.

Alternatively, as shown in FIG. 3B, if a DEK entry is found by cluster module 140 of a given host 111 at 316, then at 326, such as host 111 may receive the DEK entry from a master host 111 maintaining an inventory of the wrapped DEKs for the host cluster 110. At 328, the host 111 may use the retrieved KEK data to decrypt the wrapped DEK received from master host 111. A blank DEK may result from decrypting the wrapped DEK with the KEK data. At 324, the host 111 may use the blank DEK to encrypt (and also decrypt) data stored in VSAN 115.

While FIGS. 3A and 3B illustrate hosts 111 (1)-(*n*) performing steps 308-328 concurrently, steps 310-328 of a first host 111 (e.g., Host 111 (1)) may be performed at a time different than steps 310-328 performed at another host 111 (e.g., Hosts 111 (2)-(*n*)). Each host 111 may independently perform steps 310-326. Further, while FIGS. 3A and 3B illustrate steps with respect to DEK generation or retrieval (e.g., at 316-320 and 326-328) subsequent to retrieving KEK data from KMS 135 (e.g., at 310-314), any feasible order of steps may be used for the retrieval of a blank DEK for encryption and/or decryption of data stored in VSAN 115.

The solution presented in FIGS. 3A and 3B ensures all hosts 111 within a host cluster 110 use a common DEK for encryption of data, while also eliminating risk involved in KEK data being stored at virtualization management platform 105. However, given the partitioned design of the network, in some cases, this solution may allow for two or more hosts 111 to publish wrapped DEKs (e.g., through cluster module 140) which may lead to collisions when more than one host 111 is publishing at a same time and may inhibit the directory from achieving eventual consistency. The underlying concept behind eventual consistency is the ability to achieve high availability that informally guarantees that, if no new updates are made to a given data item, eventually all accesses to that item will return the last updated valued. Therefore, because more than one host may publish wrapped DEKs, consistency may be hindered. Accordingly, other consistency procedures may need to be used, such as locking mechanisms of the storage for the common DEK, whereby as part of step 316, if a DEK entry is not found, a host 111 attempts to get a lock of the storage location of the DEK entry. If the attempt to get the lock fails, another host may be generating the common DEK, so the host 111 may later re-perform step 316 and find a DEK entry. If the attempt by host 111 to get the lock succeeds, the host 111 may generate the common DEK as discussed. Such consistency procedures may add complexity and latency.

Figure 4:
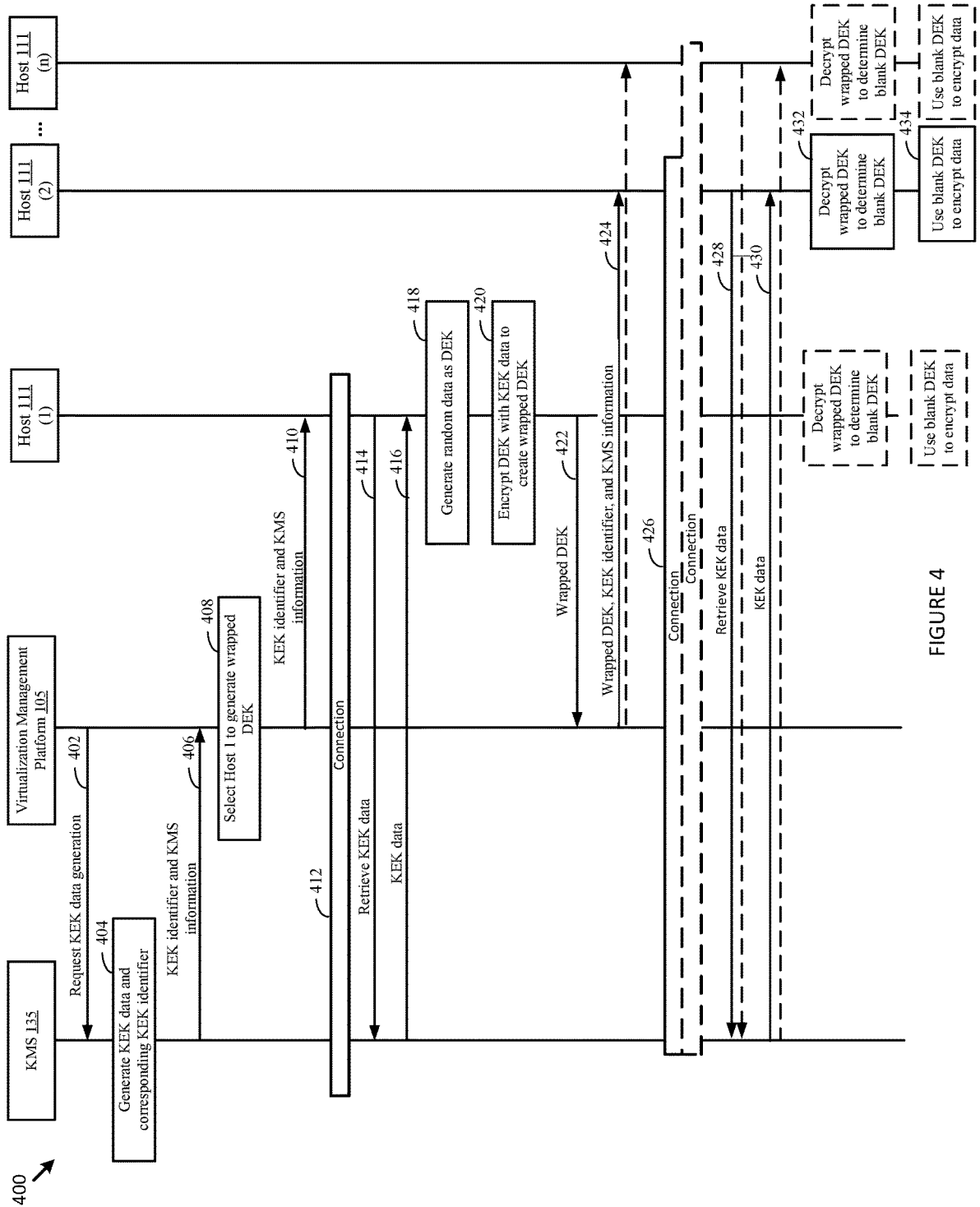
FIG. 4 is a call flow diagram illustrating another example key generation to enable encryption in a distributed datastore, according to an example embodiment of the present application.

FIG. 4 is a call flow diagram 400 illustrating another example key generation to enable encryption in a distributed datastore, according to an example embodiment of the present application. The solution described with respect to FIG. 4 involves the administration (e.g., retrieval and distribution) of both the KEK and DEK by a single host 111 prior to other hosts 111 accessing VSAN 115, as opposed to by virtualization management platform 105 in the solution presented with respect to FIG. 2 and by all hosts 111 in the solutions presented with respect to FIGS. 3A and 3B. In particular, virtualization management platform 105 may choose one host 111 to generate a DEK, wrap the DEK, and publish the wrapped DEK for retrieval and decryption by other hosts 111.

As shown in FIG. 4, at 402, virtualization management platform 105 may request generation of KEK data by KMS 135 via an API request. In response to the request, at 404, KMS 135 may generate KEK data, as well as a corresponding KEK identifier associated with the generated KEK data. At 406, KMS 135 may transmit to virtualization management platform 105 only the KEK identifier and KMS information, and not the KEK data itself. As described with respect to FIGS. 3A and 3B, the potential for compromised KEK in a core dump at virtualization management platform 105 may be avoided in this solution.

Different from FIGS. 3A and 3B, at 408, virtualization management platform 105 may select a host 111, e.g., Host 111 (1) in this illustrative example, to generate a wrapped DEK. Accordingly, steps 410-422 may only be performed by Host 111 (1).

At 410, the KEK identifier and KMS information may be provided by virtualization management platform 105 to Host 111 (1). At 412, Host 111 (1) may use the received KMS information to establish a connection with KMS 135 and, at 414, use the received KEK identifier to retrieve the corresponding KEK data from KMS 135. At 416, Host 111 (1) may receive the KEK data from KMS 135.

At 418, Host 111 (1) may generate random data as DEK and, at 420, encrypt the DEK with retrieved KEK data to create a wrapped DEK. Virtualization management platform 105 may receive the wrapped DEK from Host 111 (1), at 422, and, at 424, provide the wrapped DEK, KEK identifier, and KMS information to other hosts 111 (e.g., Hosts 111 (2)-(n)) in host cluster 110.

At 426, each host 111 (excluding selected host, Host 111 (1)) may use the received KMS information to build a connection with KMS 135, and then at 428, use the received KEK identifier to retrieve its corresponding KEK data from KMS 135. At 430, each host 111 may receive the KEK data from KMS 135.

At 432, each host 111 (excluding selected host, Host 111 (1)) may use the retrieved KEK data to decrypt (e.g., unwrap) the wrapped DEK received from virtualization management platform 105 at 424. A blank DEK may result from decrypting the wrapped DEK with the KEK data. At 434, each host 111 may use the blank DEK to encrypt (and also decrypt) data stored in VSAN 115.

While FIG. 4 illustrates hosts 111 (2)-(n) performing steps 424-434 concurrently, steps 424-434 of a first host 111 (e.g., Host 111 (2)) may be performed at a time different than steps 424-434 performed at another host 111 (e.g., Host 111 (3)-(n)). Each host 111 (2)-(n) may independently perform steps 426-434.

The solution presented in FIG. 4 ensures all hosts 111 within a host cluster 110 use a common DEK for encryption of data, while also eliminating risk involved in KEK data being stored at virtualization management platform 105 and addressing issues related to network partitioning. However, drawbacks for this solution may arise in empty cluster cases. For example, in VSAN 115, a user may first create an empty cluster and at a later time, add a host to the cluster. Because a host is not simultaneously added at the creation of the cluster, for some variable amount of time, the cluster may not be assigned any hosts. With respect to the solution presented in FIG. 4, because generation of a DEK may not occur until virtualization management platform 105 selects a host 111, DEK generation may be deferred until a new host 111 is added into the cluster, thereby causing undesired latency to DEK generation. Additionally, in this case, virtualization management platform 105 may monitor for membership changes to detect when a first host 111 joins the cluster so that key generation may be initiated. In particular, virtualization management platform 105 may be further synchronized with host joining events in the cluster, which may lead to difficulty in implementation.

Figure 5:
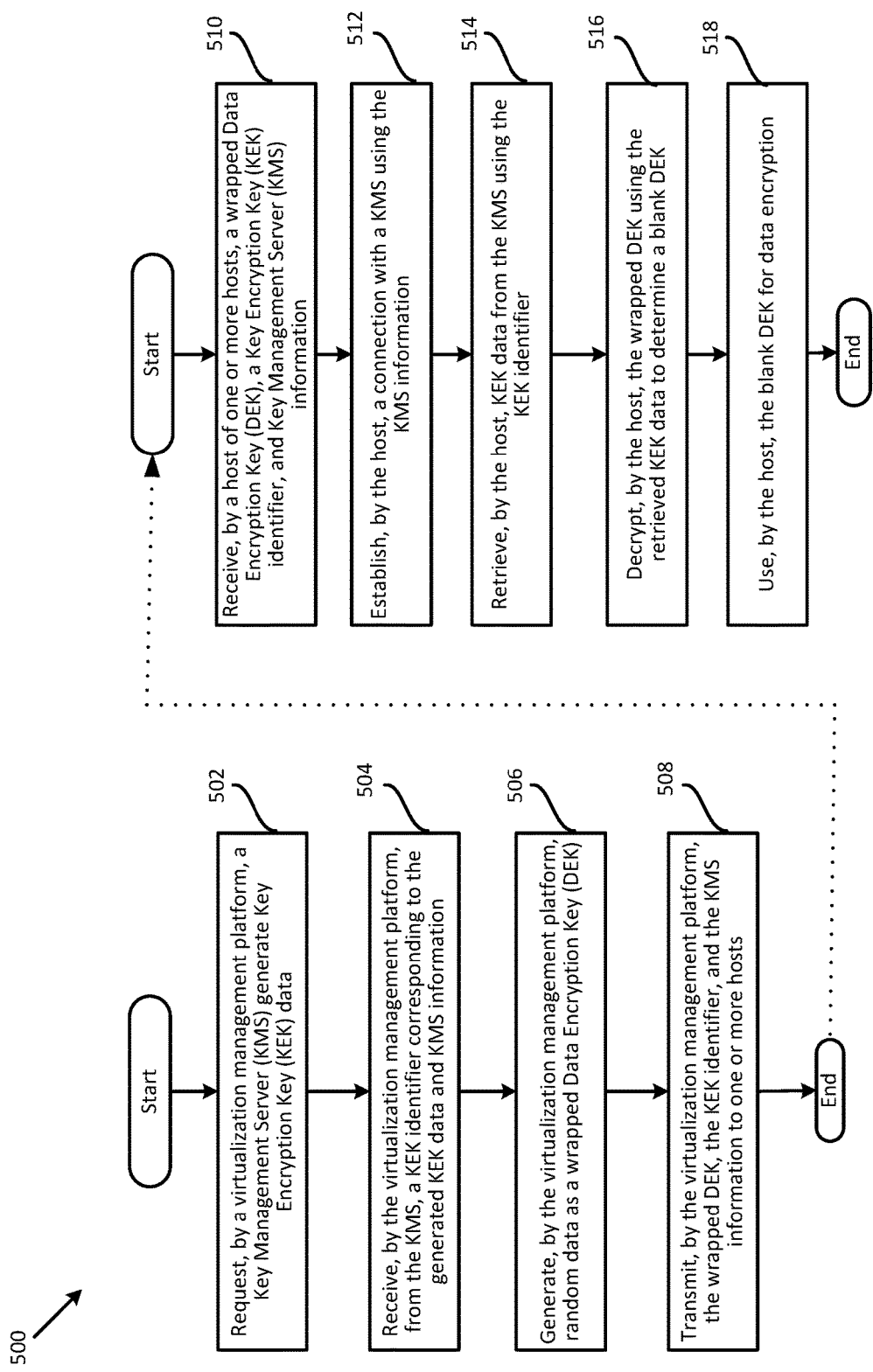
FIG. 5 is a flowchart illustrating a method (or process) for enabling encryption in a distributed datastore, according to an example embodiment of the present application.

FIG. 5 is a flowchart illustrating a method (or process) 500 for encryption in a distributed datastore, according to an example embodiment of the present application. Method 500, specifically operations at blocks 502 through 508, may be performed by a virtualization management platform (e.g., such as virtualization management platform 105 of FIG. 1) while operations at blocks 510 through 518 may be performed by a host of one or more hosts in a host cluster (e.g., such as host 111 of host cluster 110 of FIG. 1). In some other embodiments, operations of method 500 may be performed by other modules that reside in data center 102.

Method 500 may start, at block 502, by virtualization management platform 105 requesting a KMS (e.g., such as KMS 135 of FIG. 1) generate KEK data. At block 504, virtualization management platform 105 receives from KMS 135 a KEK identifier corresponding to the generated KEK data and KMS information. At block 506, virtualization management platform 105 generates random data as a wrapped DEK and, at block 508, transmits the wrapped DEK, the KEK identifier, and the KMS information to one or more hosts (e.g., such as hosts 111 of FIG. 1).

At block 510, a host 111 of one or more hosts 111, receives the wrapped DEK, the KEK, and the KMS information transmitted by virtualization management platform 105. At block 512, host 111 establishes a connection with KMS 135 using the KMS information and, at block 514, retrieves KEK data from KMS 135 using the KEK identifier. At block 516, host 111 decrypts the wrapped DEK using the retrieved KEK data to determine a blank DEK. At block 518, host 111 uses the blank DEK for data encryption.

Figure 6:
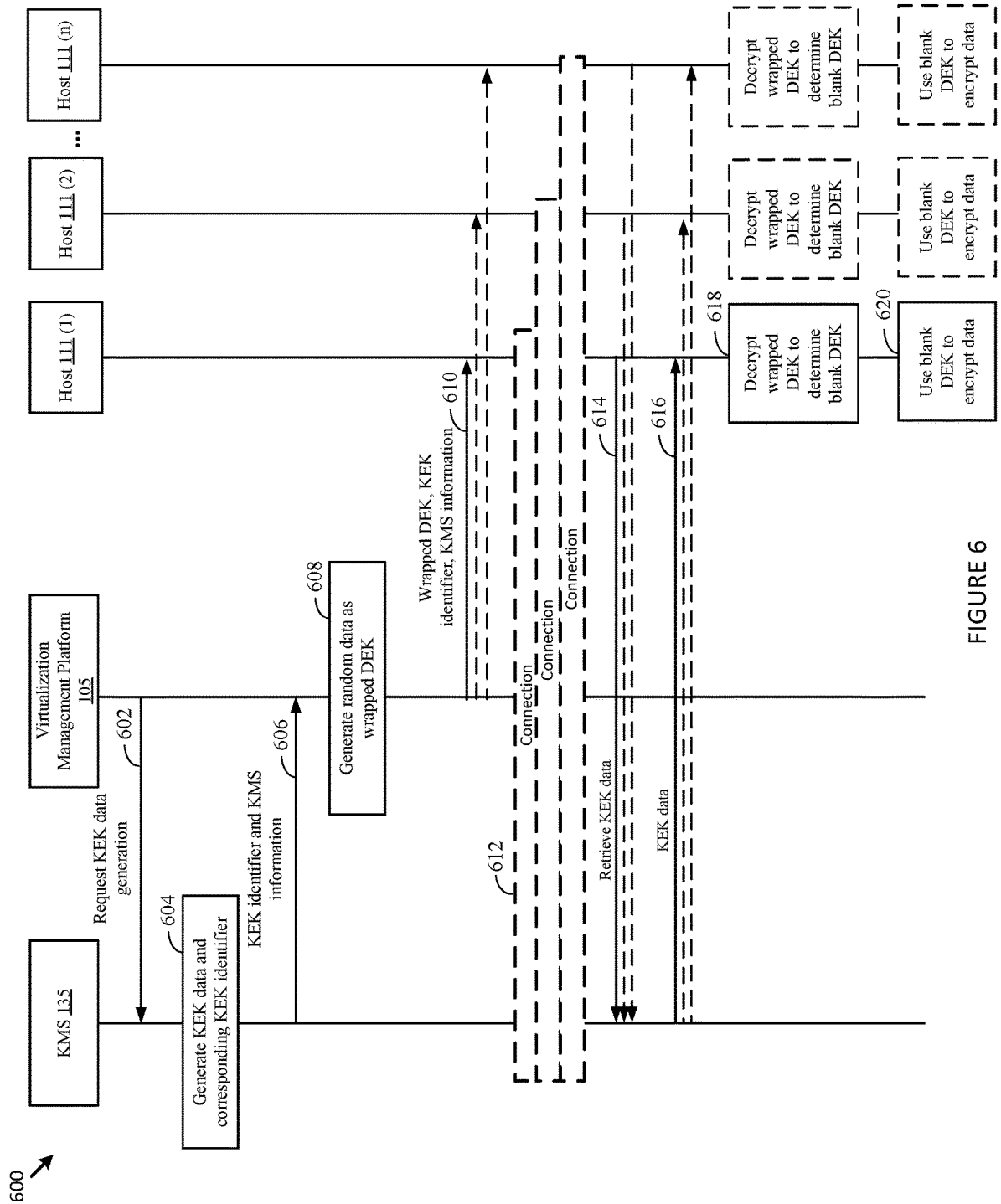
FIG. 6 is a call flow diagram illustrating another example key generation to enable encryption in a distributed datastore, according to an example embodiment of the present application.

Method 500 of FIG. 5 may be understood with reference to diagram 600 of FIG. 6. FIG. 6 is a call flow diagram 600 illustrating another example key generation to enable encryption in a distributed datastore, according to an example embodiment of the present application.

As shown in FIG. 6, at 602, virtualization management platform 105 may request generation of KEK data by KMS 135 via an API request. In response to the request, at 604, KMS 135 may generate KEK data, as well as a corresponding KEK identifier associated with the generated KEK data. At 606, KMS 135 may transmit to virtualization management platform 105 only the KEK identifier and KMS information, and not the KEK data itself.

At 608, virtualization management platform 105 may generate random data as wrapped DEK, as opposed to virtualization management platform 105 generating random data as DEK in the solution of FIG. 1 or host 111 generating random data as DEK in the solution of FIG. 4. Although referred to as a "wrapped" DEK, random data generated as the wrapped DEK is not generated using any keys (e.g., the wrapped DEK is not wrapped by the KEK). According to certain aspects, the random wrapped DEK may be generated to have the same size as the DEK (e.g., 512 bits).

At 610, the wrapped DEK, KEK identifier, and KMS information may be transmitted by virtualization management platform 105 to one or more hosts 111. A variable number, n, of hosts 111 (e.g., Host 111 (1), Host 111 (2), . . . Host 111 (n)) may receive the wrapped DEK, KEK identifier, and KMS information. At 612, each of hosts 111 may use the received KMS information to establish a connection with KMS 135 and, at 614, use the received KEK identifier to retrieve the corresponding KEK data from KMS 135. At 616, each host 111 may receive the KEK data from KMS 135.

At 618, each host 111 may use the retrieved KEK data to decrypt the wrapped DEK received at 610 to return a blank DEK. At 620, each host 111 may use the blank DEK to encrypt (and also decrypt) data stored in VSAN 115.

While FIG. 6 illustrates hosts 111 (1)-(n) performing steps 610-620 concurrently, steps 610-620 of a first host 111 may be performed at a time different than steps 610-620 performed at another host 111. Each host 111 may independently perform steps 610-620.

As described herein, rekeying may be used to protect against possible exposure of the initial encryption key (e.g., generated DEK). For the solution presented in FIG. 6, rekeying procedures may also include shallow rekeying and deep rekeying.

Figure 7:
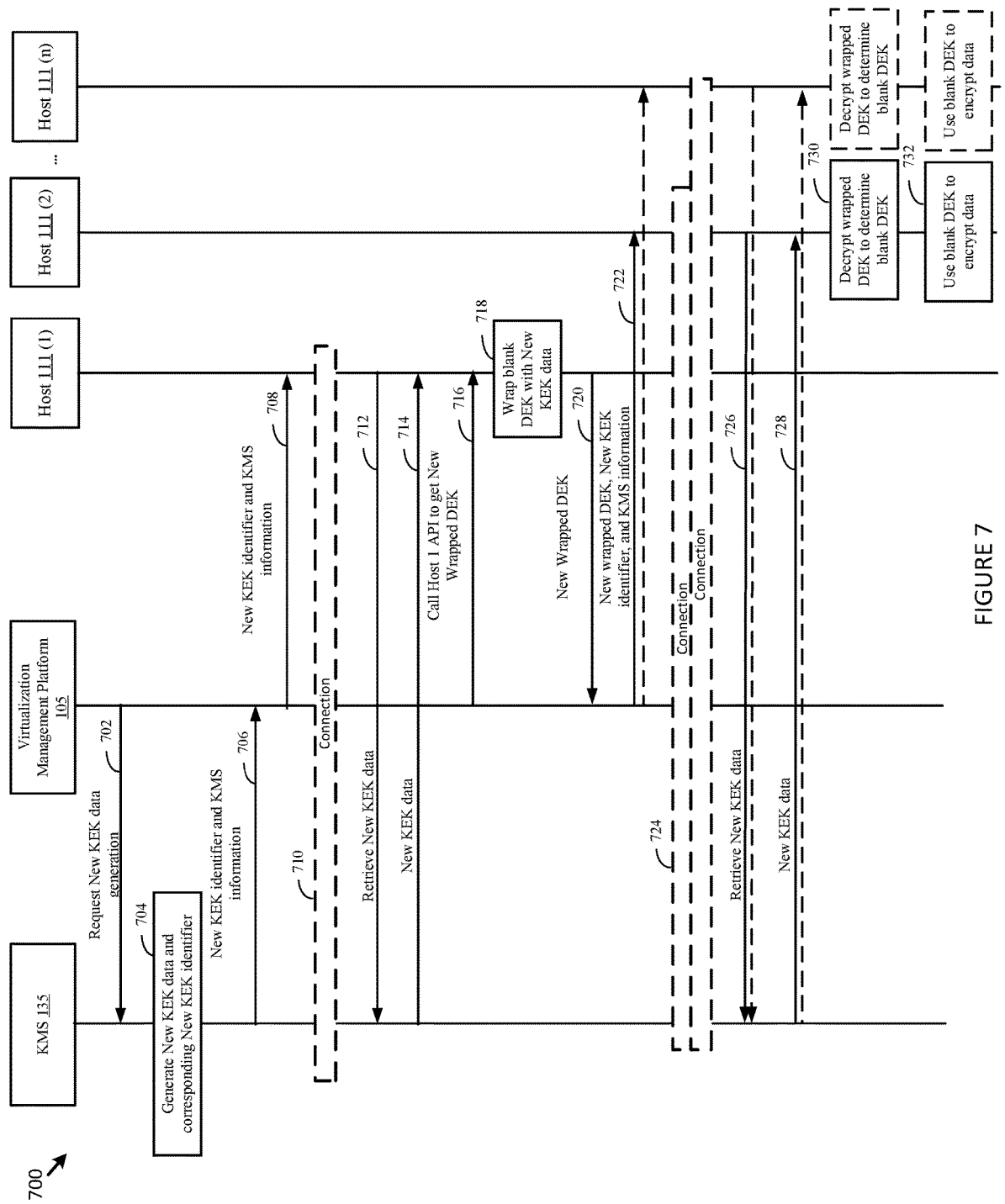
FIG. 7 is a call flow diagram illustrating example shallow rekeying in a distributed datastore, according to an example embodiment of the present application.

FIG. 7 is a call flow diagram illustrating example shallow rekeying in a distributed datastore, according to an example embodiment of the present application. As shown in FIG. 7, the shallow rekey procedure may begin by virtualization management platform 105 requesting new KEK data from KMS 135 (e.g., at 702 and 704). At 706, virtualization management platform 105 may receive a new KEK identifier associated with the new KEK generated by KMS 135 at 704. Virtualization management platform 105 may also receive KMS information. At 708, virtualization management platform 105 may transmit the new KEK identifier and KMS information to one host of a variable number, n, of hosts 111 (e.g., Host 111 (1), Host 111 (2), . . . Host 111 (n)). In the illustrative example, virtualization management platform 105 transmits the new KEK identifier and KMS information to Host 111 (1). At 710, 712, and 714, respectively, Host 111 (1) may establish a connection with KMS 135 using received KMS information, retrieve the new KEK data using the received KEK identifier, and receive the new KEK data, in response to the request. At such point, Host 111(1) may possess both new KEK data and the prior blank DEK used to encrypt data within VSAN 115.

At 716, virtualization management platform 105 may call Host 111 (1)'s API to obtain the new wrapped DEK. In particular, virtualization management platform 105 uses API "GetWrappedDEK(kekID)" to acquire the DEK wrapped with new KEK data. In response, at 718, Host 111 (1) may wrap the initial (or prior) blank DEK with the newly obtained KEK data (at 714). At 720, Host 111 (1) may provide the new wrapped DEK back to virtualization management platform 105.

At 722, the new wrapped DEK, new KEK identifier, and KMS information may be provided by virtualization management platform 105 to one or more hosts 111. A variable number, n, of hosts 111 (e.g., Host 111 (2), . . . Host 111 (n)), excluding Host 111 (1), may receive the new wrapped DEK, KEK identifier, and KMS information. At 724, each of hosts 111, excluding Host 111 (1), may use the received KMS information to build a connection with KMS 135, and then at 726, use the received new KEK identifier to retrieve its corresponding new KEK data from KMS 135. At 728, each host 111, excluding Host 111 (1), may receive the KEK data from KMS 135.

At 730, each host 111, excluding Host 111 (1), may use the retrieved KEK data to decrypt the newly wrapped DEK received at 722 to return the blank DEK. At 732, each host 111 may use the blank DEK to encrypt (and also decrypt) data stored in VSAN 115. As described, in the shallow rekey procedure, only the KEK data may change, while the DEK data remains the same and is only encrypted with the new KEK data.

While FIG. 7 illustrates hosts 111 (2)-(n) performing steps 722-732 concurrently, steps 722-732 of a first host 111 may be performed at a time different than steps 722-732 performed at another host 111. Each host 111 may independently perform steps 722-732. Additionally, while FIG. 7 illustrates virtualization management platform 105 calling an API of Host 111 (1) to wrap the blank DEK with new KEK data, any host 111 of the host cluster 110 may be called by virtualization management platform 105 to obtain the newly wrapped DEK.

Alternatively, for the solution presented in FIG. 6, a deep rekey procedure may be performed by repetition of all steps 602 through 620 to generate both new DEK and KEK data. For example, virtualization management platform 105 may request new KEK data and generate new random data as the new wrapped DEK. Hosts 111 may determine the new blank DEK in a similar manner as presented in steps 610 through 620 of FIG. 6; however, new KEK data may be used to decrypt the newly wrapped DEK, as opposed to initial (or prior) KEK data.

The solution presented in FIGS. 5, 6, and 7 may overcome drawbacks of solutions presented in FIGS. 2, 3A, 3B, and 4 for enabling encryption in a distributed datastore, such as VSAN 115. For example, the potential for compromised KEK in a core dump at virtualization management platform 105 may be avoided in this solution because virtualization management platform 105 does retrieve KEK data from KMS 135. Packaging a cryptograph library at virtualization management platform 105 may be avoided because the DEK encryption and decryption is performed by the hosts 111 as opposed to by virtualization management platform 105. Issues related to network partitioning may be avoided because random data is generated as a wrapped DEK at virtualization management platform 105 instead of generation by one or more hosts 111. Issues related to empty cluster cases may be avoided because a DEK may be generated even when the cluster is empty. Dependencies on other modules, such as a CMMDS or cluster module 140 are also eliminated. As such, the solution presented in FIGS. 5, 6, and 7 presents a simple, yet secure key management algorithm for the generation of cluster-wide keys in a distributed datastore.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can be a non-transitory computer readable medium. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for encryption in a distributed datastore, the method comprising:
   receiving random data from a virtualization management platform, wherein the random data is not generated using any encryption keys;
   retrieving a key encryption key (KEK) from a key management server (KMS);
   decrypting the random data using the KEK, as if the random data were a wrapped data encryption key (DEK), to determine an unwrapped DEK to be used in common by a plurality of hosts of a host cluster accessing the distributed datastore;
   encrypting first data using the unwrapped DEK; and
   storing the encrypted first data in one or more disks of the distributed datastore, the one or more disks belonging to the plurality of hosts.

2. The method of claim 1, further comprising:
   receiving a write input/output (I/O) request for second data;
   encrypting second data using the unwrapped DEK; and
   storing the encrypted second data in the one or more disks of the distributed datastore.

3. The method of claim 1, further comprising:
   receiving a read input/output (I/O) request for the first data;
   decrypting the encrypted first data using the unwrapped DEK; and
   servicing the read I/O request using the decrypted first data.

4. The method of claim 1, further comprising:
   moving the encrypted first data from the one or more disks where the encrypted first data is originally stored to one or more other disks of the distributed datastore without decrypting the encrypted first data or re-encrypting the first data.

5. The method of claim 1, wherein the virtualization management platform transmits to each of the plurality of hosts the random data with a KEK identifier (ID) and KMS information, wherein the KMS information comprises addressing information for establishing a connection with the KMS.

6. The method of claim 5, wherein retrieving the KEK from the KMS comprises:
establishing, by each host of the plurality of hosts, the connection with KMS using the KMS information; and
retrieving, by each host of the plurality of hosts, the KEK from the KMS using the KEK ID received from the virtualization management platform.

7. The method of claim 5, wherein each host of the plurality of hosts decrypts the wrapped DEK using the KEK to determine the unwrapped DEK.

8. The method of claim 1, further comprising:
receiving by a host of the plurality of hosts a new KEK ID;
retrieving, by the host, a new KEK from the KMS using the new KEK ID;
receiving, by the host, a request to wrap the unwrapped DEK with the new KEK;
wrapping, by the host, the unwrapped DEK with the new KEK to create a new wrapped DEK, in accordance with the request; and
transmitting, by the host, to the virtualization management platform, the new wrapped DEK.

9. The method of claim 8, further comprising:
receiving the new wrapped DEK from the virtualization management platform;
retrieving the new KEK from the KMS;
decrypting the new wrapped DEK using the new KEK to determine the unwrapped DEK;
encrypting second data using the unwrapped DEK; and
storing the encrypted second data in the one or more disks of the distributed datastore.

10. A non-transitory computer readable medium comprising instructions that, when executed by one or more processors of a computing system, cause the computing system to perform operations for encryption in a distributed datastore, the operations comprising:
receiving random data from a virtualization management platform, wherein the random data is not generated using any encryption keys;
retrieving the KEK from a key management server (KMS);
decrypting the random data using the KEK, as if the random data were a wrapped data encryption key (DEK), to determine an unwrapped DEK to be used in common by a plurality of hosts of a host cluster accessing the distributed datastore;
encrypting first data using the unwrapped DEK; and
storing the encrypted first data in one or more disks of the distributed datastore, the one or more disks belonging to the plurality of hosts.

11. The non-transitory computer readable medium of claim 10, wherein the operations further comprise:
receiving a write input/output (I/O) request for second data;
encrypting second data using the unwrapped DEK; and
storing the encrypted second data in the one or more disks of the distributed datastore.

12. The non-transitory computer readable medium of claim 10, wherein the operations further comprise:
receiving a read input/output (I/O) request for the first data;
decrypting the encrypted first data using the unwrapped DEK; and
servicing the read I/O request using the decrypted first data.

13. The non-transitory computer readable medium of claim 10, wherein the operations further comprise:
moving the encrypted first data from the one or more disks where the encrypted first data is originally stored to one or more other disks of the distributed datastore without decrypting the encrypted first data or re-encrypting the first data.

14. The non-transitory computer readable medium of claim 10, wherein the virtualization management platform transmits to each of the plurality of hosts the random data with a KEK identifier (ID) and KMS information, wherein the KMS information comprises addressing information for establishing a connection with the KMS.

15. The non-transitory computer readable medium of claim 14, wherein retrieving the KEK from the KMS comprises:
establishing, by each host of the plurality of hosts, the connection with KMS using the KMS information; and
retrieving, by each host of the plurality of hosts, the KEK from the KMS using the KEK ID received from the virtualization management platform.

16. The non-transitory computer readable medium of claim 14, wherein each host of the plurality of hosts decrypts the wrapped DEK using the KEK to determine the unwrapped DEK.

17. The non-transitory computer readable medium of claim 10, wherein the operations further comprise:
receiving by a host of the plurality of hosts a new KEK ID;
retrieving, by the host, a new KEK from the KMS using the new KEK ID;
receiving, by the host, a request to wrap the unwrapped DEK with the new KEK;
wrapping, by the host, the unwrapped DEK with the new KEK to create a new wrapped DEK, in accordance with the request; and
transmitting, by the host, to the virtualization management platform, the new wrapped DEK.

18. The non-transitory computer readable medium of claim 17, wherein the operations further comprise:
receiving the new wrapped DEK from the virtualization management platform;
retrieving the new KEK from the KMS;
decrypting the new wrapped DEK using the new KEK to determine the unwrapped DEK;
encrypting second data using the unwrapped DEK; and
storing the encrypted second data in the one or more disks of the distributed datastore.

19. A system comprising:
one or more processors; and
at least one memory, the one or more processors and the at least one memory configured to:
receive random data from a virtualization management platform, wherein the random data is not generated using any encryption keys;
retrieve the KEK from a key management server (KMS);
decrypt the random data using the KEK, as if the random data were a wrapped data encryption key (DEK), to determine an unwrapped DEK to be used in common by a plurality of hosts of a host cluster accessing the distributed datastore;

encrypt first data using the unwrapped DEK; and store the encrypted first data in one or more disks of the distributed datastore, the one or more disks belonging to the plurality of hosts.

20. The system of claim 19, wherein the one or more processors and the at least one memory are further configured to:

receive a write input/output (I/O) request for second data;

encrypt second data using the unwrapped DEK; and store the encrypted second data in the one or more disks of the distributed datastore.

* * * * *